Figure 1:
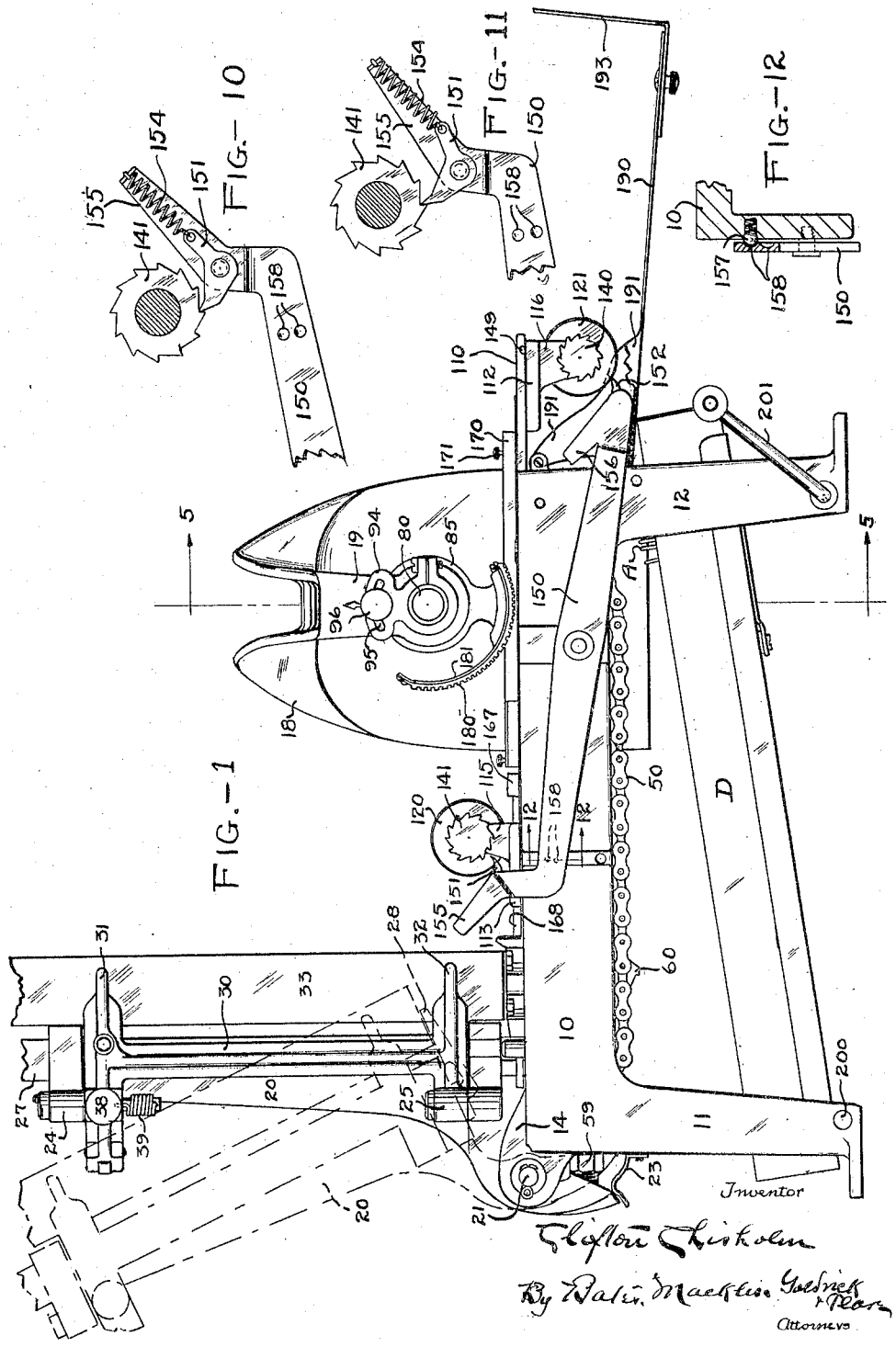

Aug. 17, 1926.
C. CHISHOLM
ADDRESSING MACHINE
Filed Oct. 25, 1924    10 Sheets-Sheet 3

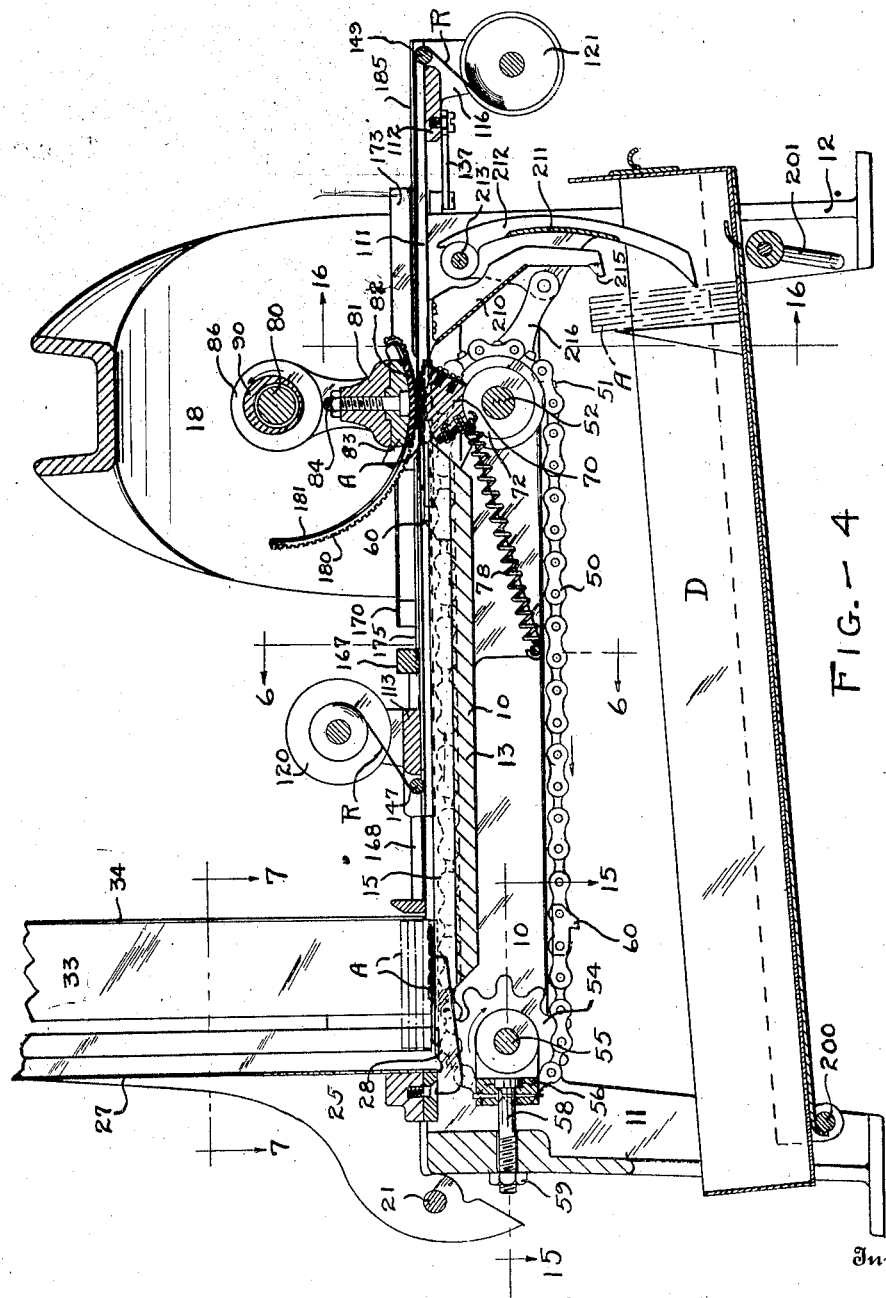

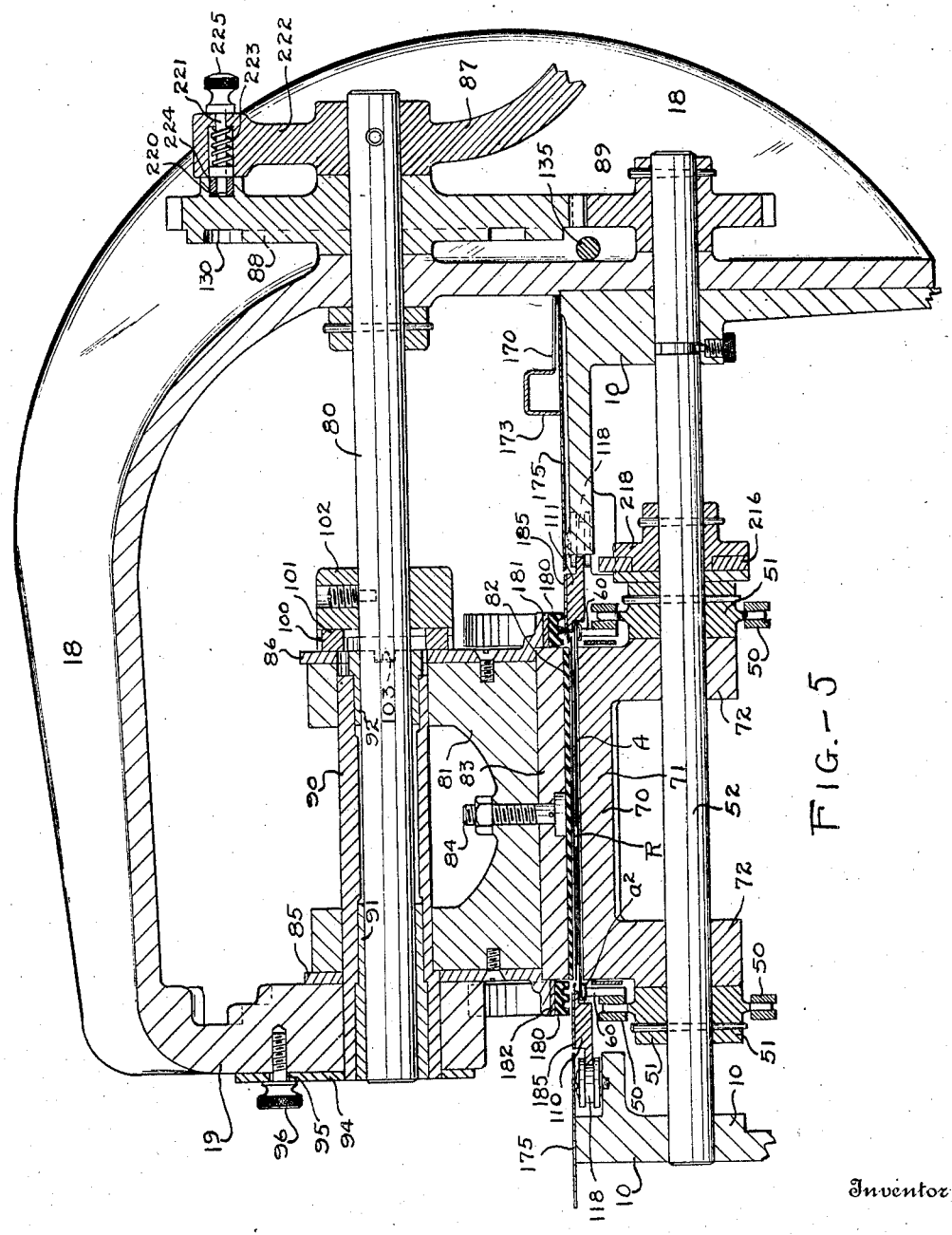

Aug. 17, 1926.

C. CHISHOLM

ADDRESSING MACHINE

Filed Oct. 25, 1924   10 Sheets-Sheet 6

1,595,994

Aug. 17, 1926.
C. CHISHOLM
1,595,994
ADDRESSING MACHINE
Filed Oct. 25, 1924    10 Sheets-Sheet 8
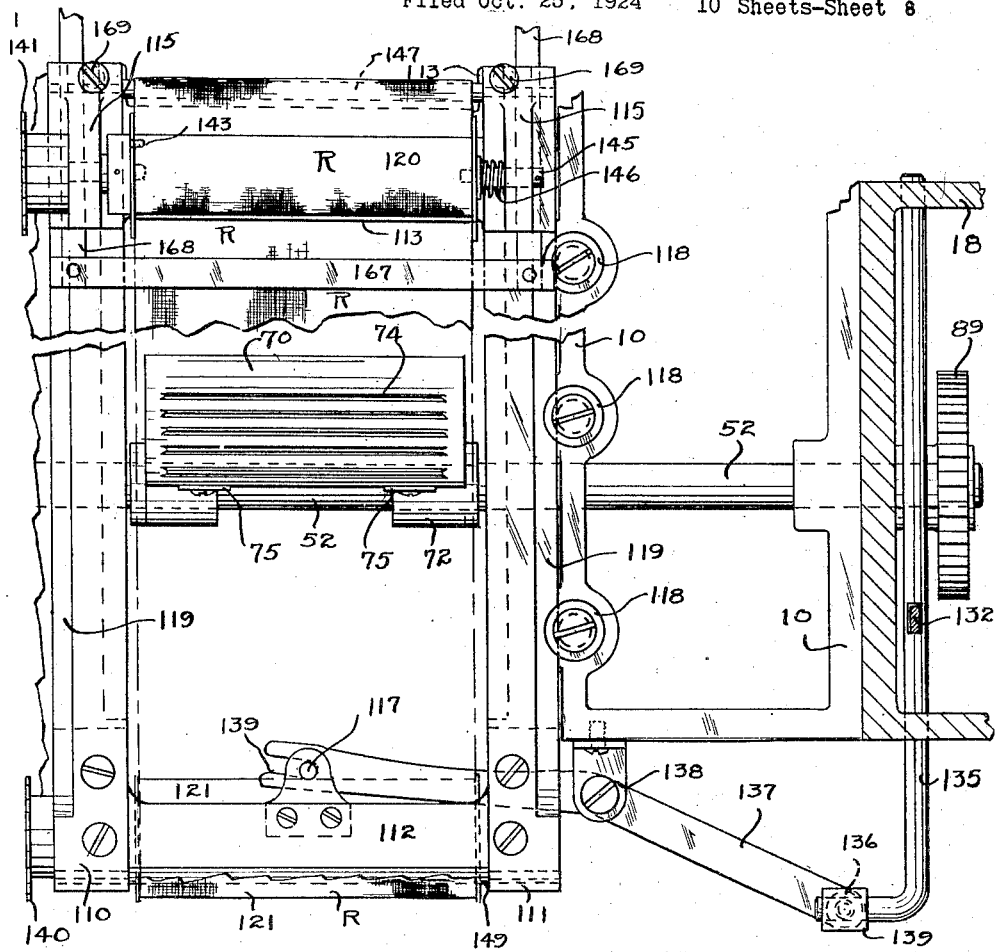
FIG.—9
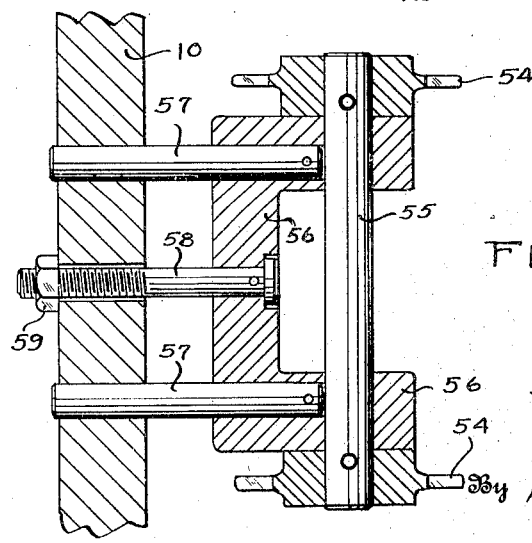
FIG.—15
Inventor

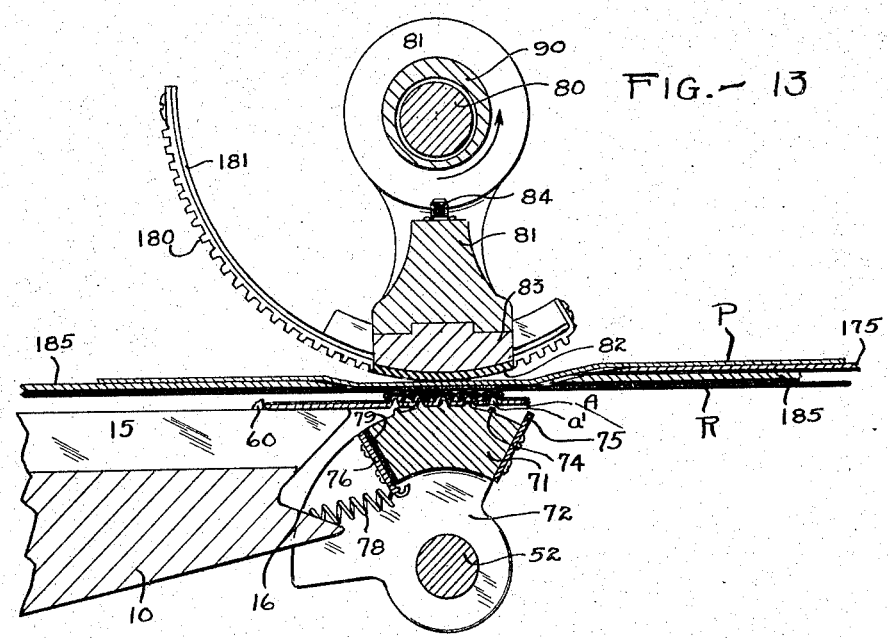
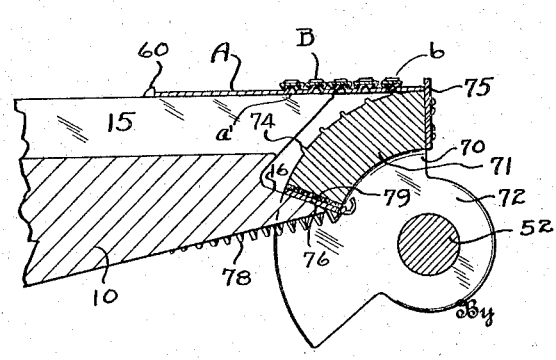

Patented Aug. 17, 1926.

1,595,994

UNITED STATES PATENT OFFICE.

CLIFTON CHISHOLM, OF CLEVELAND, OHIO, ASSIGNOR TO THE AMERICAN MULTI-GRAPH COMPANY, OF CLEVELAND, OHIO, A CORPORATION OF OHIO.

ADDRESSING MACHINE.

Application filed October 25, 1924. Serial No. 745,902.

This invention relates to an addressing machine wherein address plates are fed one after the other from a stack thereof and pass, conjointly with an inking ribbon and paper to be printed, between a pair of platens which effect the printing impression on the paper, after which the paper and plates are discharged into respective receptacles.

The general object of the invention is to provide such machine in a simple, inexpensive and yet efficient form. One of the features of the invention contributing this result is a reciprocating frame carrying two ribbon spools, the ribbon traveling forward with the plate and paper during the impression and the frame then returning to normal position.

Another feature comprises a mechanism for periodically feeding such ribbon step by step to provide a fresh surface to the printing lines, and for automatically changing the direction of feed whenever either spool becomes empty.

Another feature of the invention comprises so arranging the supporting platen that it will operate automatically to position the plate accurately on the conveyor, preventing overfeeding by momentum. Another feature relates to a very simple means for changing the relation between the conveyor and the impression platen to enable the printing of only a portion of the lines on the address plate. Still another feature comprises a very simple paper ejecting device carried with the platen and operating to eject forwardly paper which is positioned by lateral movement between the platens. My invention also includes features of the magazine and of the restacking mechanism.

All of the above mentioned characteristics, which contribute to the general efficiency of the machine, are hereinafter more fully explained. The essential novel features are summarized in the claims. My invention, though not limited thereto, is well adapted for a hand operated machine, and such is the form shown in the drawings.

Figure 2:
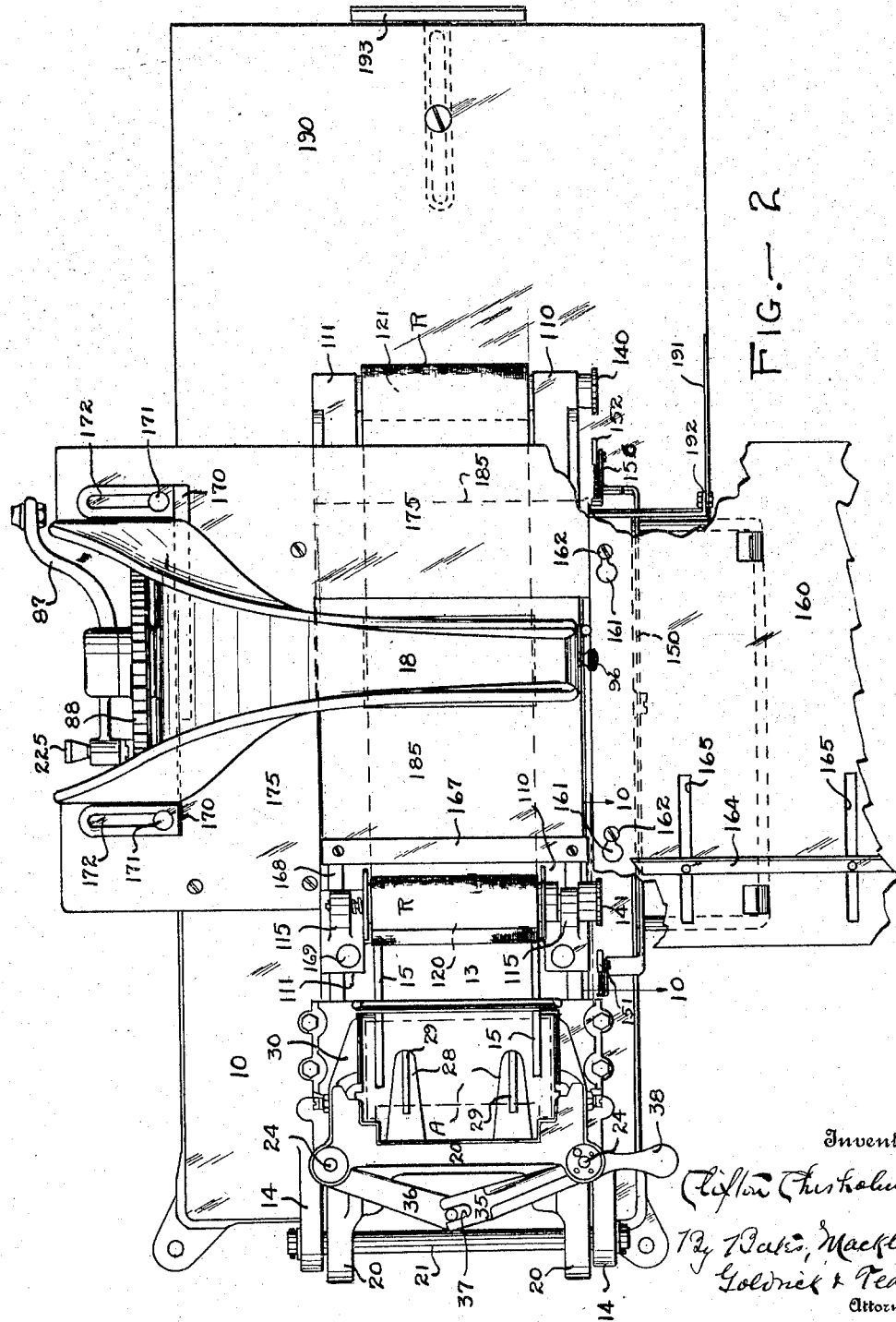
Figure 3:
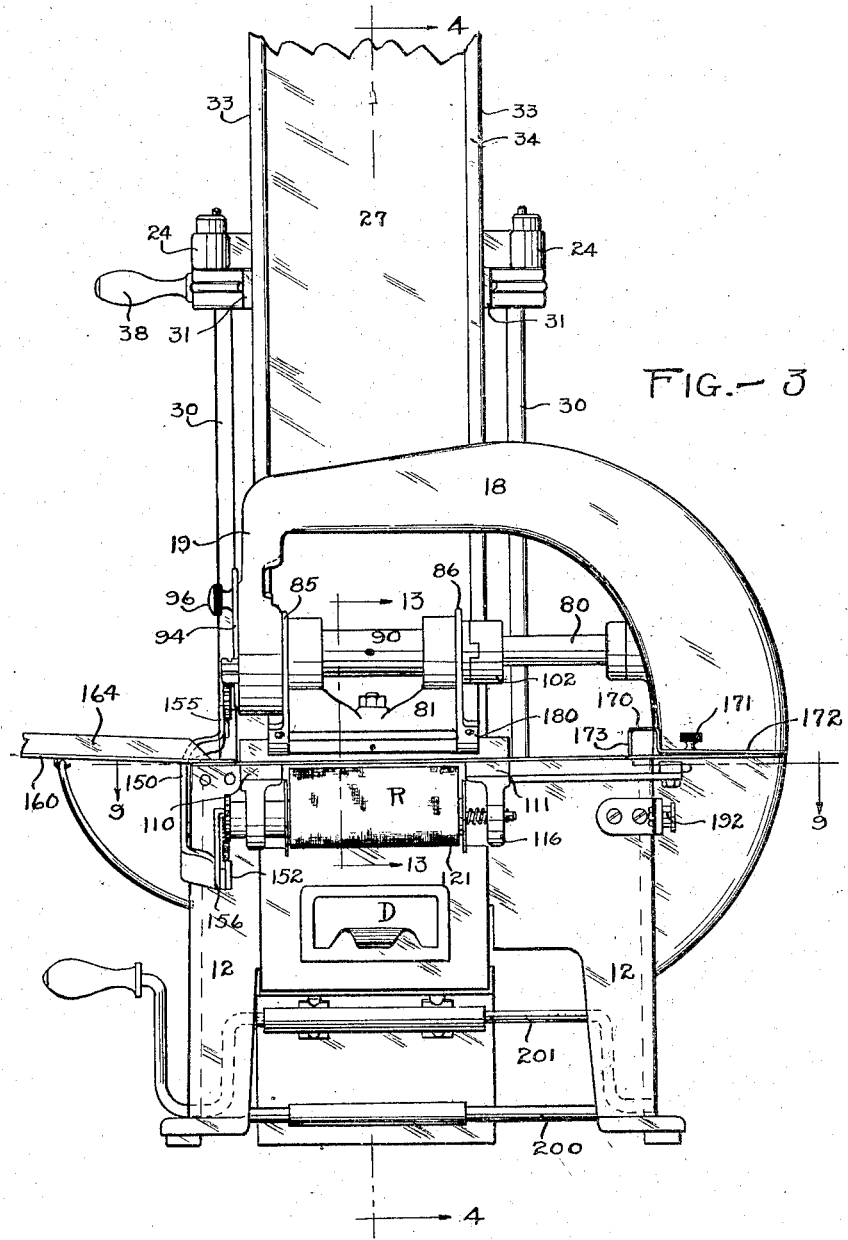
Figure 7:
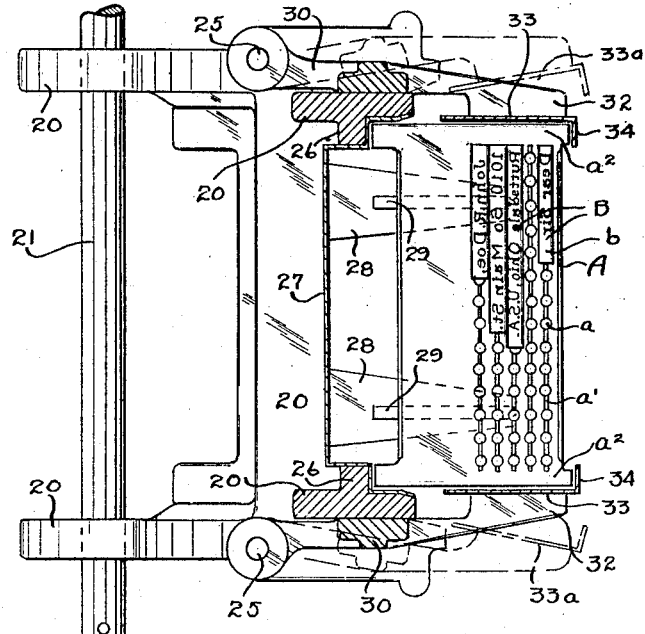
Figure 6:
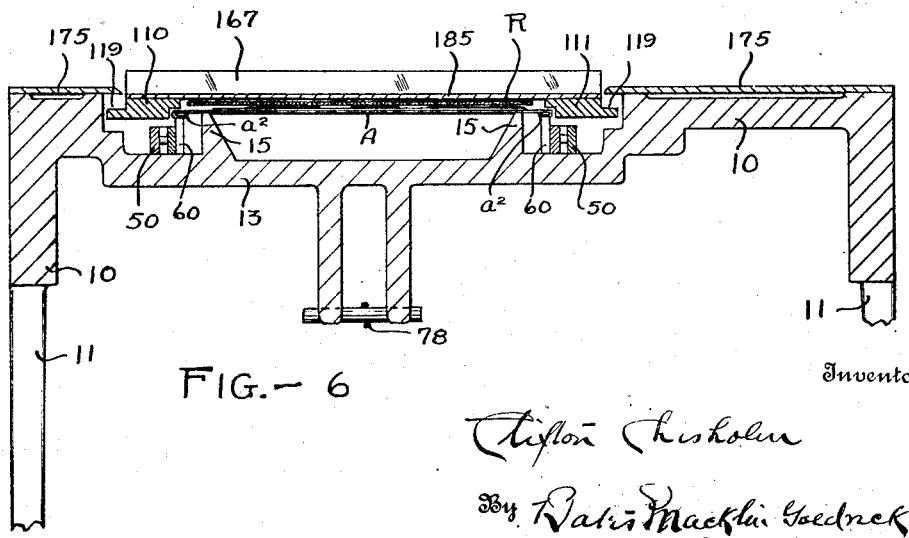
Figure 8:
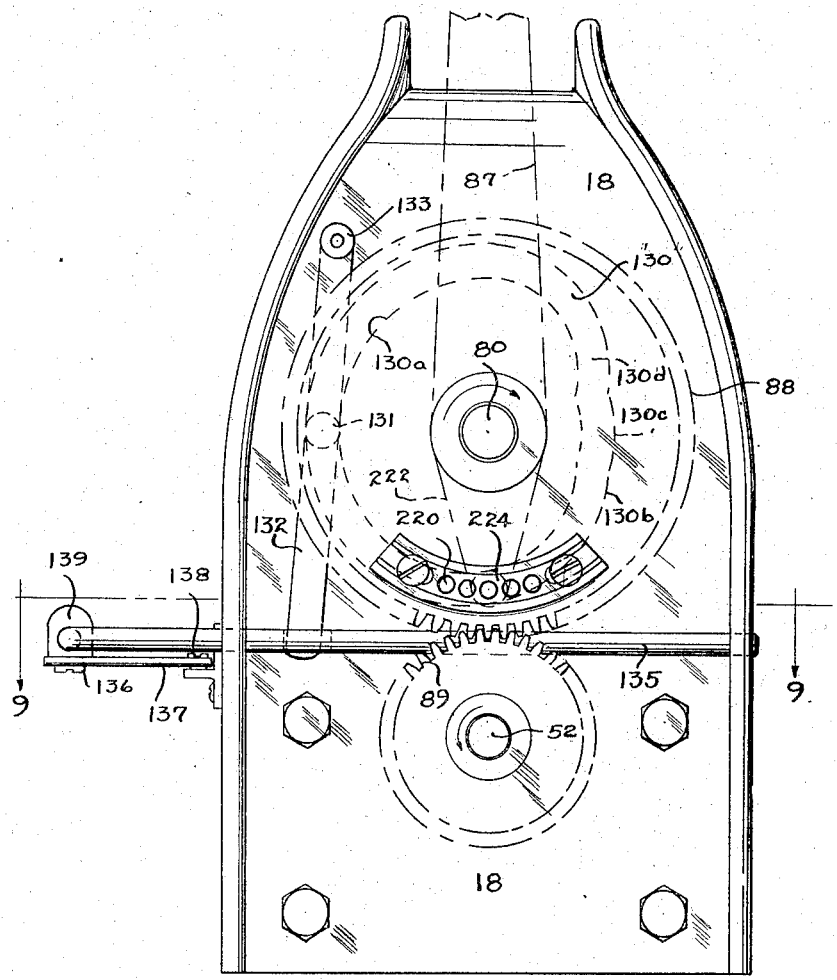
Figure 16:
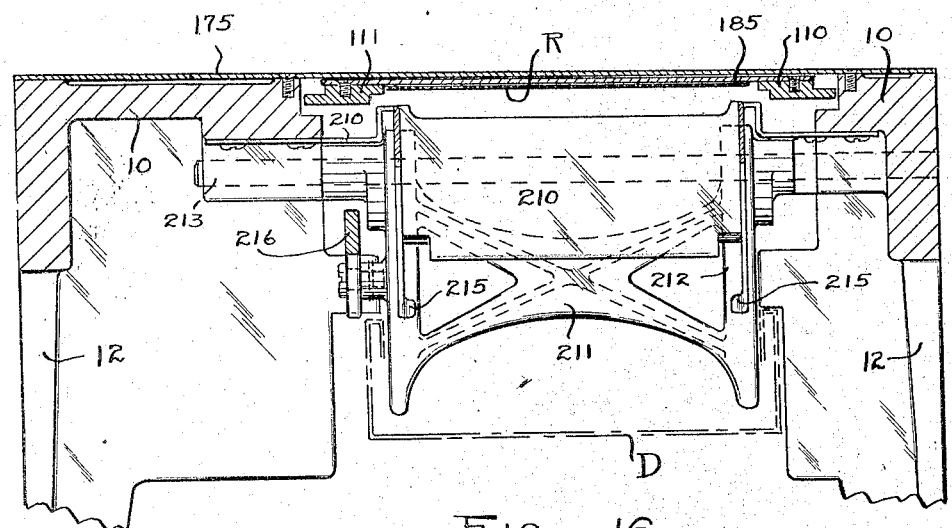
Figure 17:
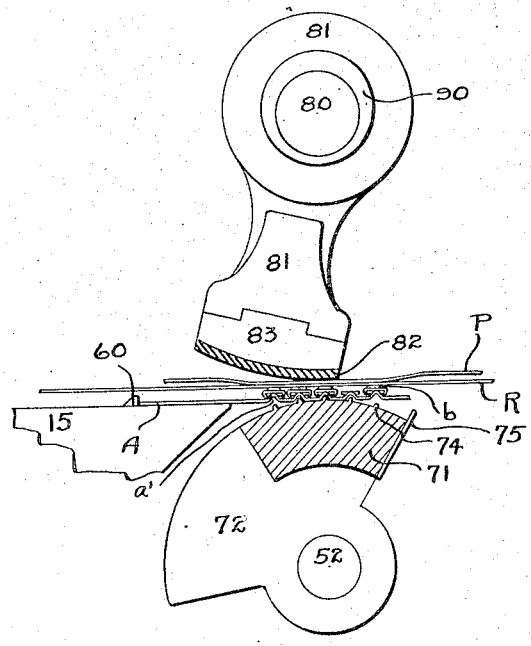

In the drawings, Fig. 1 is a side elevation of the machine, the upper portion of the magazine being broken away, and a portion of one of the ears of the paper-receiving tray being broken away; Fig. 2 is a plan of the machine, portions of the paper table being broken away; Fig. 3 is a front elevation of the machine, portions of the paper table and the magazine broken away and the receiving tray being removed; Fig. 4 is a vertical longitudinal section taken in a plane parallel with Fig. 1, as indicated by the line 4—4 on Fig. 3; Fig. 5 is a vertical cross section on a larger scale through the supporting arm and platen and cooperative parts, as indicated by the line 5—5 on Fig. 1; Fig. 6 is a vertical transverse section through the bed and ribbon frame; Fig. 7 is a horizontal section through the magazine indicated by the line 7—7 on Fig. 4; Fig. 8 is a side elevation, on the same scale as Fig. 5 of that portion of the machine having the driving gearing, the crank being removed; Fig. 9 is a sectional plan, on a plane indicated by the line 9—9 on Fig. 3, showing the mechanism for reciprocating the ribbon; Figs. 10 and 11 (Sheet 1) are details illustrating different portions of the ribbon-ratchet and feeding-pawl arrangement, these views looking in the opposite direction to Fig. 1; Fig. 12 (Sheet 1) is a detail as indicated by the line 12—12 on Fig. 1; Fig. 13 is a vertical section on the line 13—13 on Fig. 3; Fig. 14 is a vertical section on the same plane, illustrating the plate supporting platen in its normal or receiving position; Fig. 15 (Sheet 8) is a horizontal section through the support for the rear end of the plate feeding chains, as indicated by the line 15—15 on Fig. 4; Fig. 16 is a vertical section on the line 16—16 on Fig. 4 looking toward the front of the machine and illustrating the mechanism for discharging the plates into the receiving drawer; Fig. 17 is a somewhat diagrammatic vertical section through the coacting platens illustrating the relative position of the impression platen when it is desired to avoid printing one or more lines on the address plate.

The frame of the machine comprises essentially a horizontal bed 10 having a longitudinally depressed portion 13 and suitable supporting legs, as the rear legs 11, 11 and the forward legs 12, 12. The magazine for the stack of plates for printing comprises an upright structure at the rear of the machine. This consists primarily of a vertical bracket 20 hinged by a shaft 21 to ears 14 extending from the bed, one or more springs 23 serving to keep this bracket normally in an upright position. The bracket is shown in Fig. 7 as comprising a pair of upright spaced arms having ribs 26 and connected by a sheet metal plate 27. The bracket carries a pair of forwardly projecting feet 28 having raised ribs 29 forming the bottom support of the plates in the magazine.

Hinged to the opposite edges of the bracket on vertical pivots 24 and 25 are a pair of yokes 30 which have arms 31 and 32 extending forwardly from the body of the yoke. Each arm carries a shield plate 33 L-shaped in a cross-section, as shown in Fig. 7, the forward portions of these shields extending transversely of the machine some distance in front of the plate 27. The bracket, plate 27 and the two shields accordingly provide a skeleton vertical receptacle which is of such dimensions and so shaped as to carry freely a stack of address plates one above the other.

The topmost arms 31 of the two yokes 30 extend as horizontal bell cranks rearwardly behind the pivots 24, as shown at 35 and 36 (Fig. 2) and are connected by a pin and slot 37. The arm 31 also has an outwardly extending handle 38. Accordingly, when the handle is moved rearwardly, the corresponding yoke 30 is swung outwardly and the yoke on the other side, through the interlinked arms 35 and 36, likewise swings outwardly, so that the front portions 34 of the shields swing apart. Suitable spring means, as for instance the torsion spring 39 acting on the handle 38, tends to keep the yokes in engagement with the bracket arms 20 which maintains the shields in normal position with their front portions 34 overhanging the address plates and thus substantially closing the front of the magazine. However, by swinging the handle 38 rearwardly the front of the magazine is opened as shown at 33$^a$ in Fig. 7, to provide for installation of plates.

The address plates are stored in a drawer to allow them to be transferred conveniently from such drawer to the magazine described, it is only necessary for the operator to grasp the handle 38 and shove it rearwardly, thereby first swinging the handle about its pivot 24 to withdraw the shields 34 from the front of the magazine space and then by a continued rearward pressure, tip the whole magazine backwardly about the pivot 21 into the position illustrated by broken lines in Fig. 1, then the drawer is stood vertically in the magazine with its top toward the rear and tipped rearwardly so that the plates will slide by gravity in a stack out of the drawer into the magazine; then the drawer is removed and the release of the handle returns the shields to position to close the front of the magazine and allows the whole magazine to swing forwardly into vertical position shown in Fig. 1.

Fig. 7 illustrates at A, one of the address plates. In the form shown, this has a series of overhanging buttons $a$ on its upper surface connected by corrugations $a'$. The buttons carry flanged embossed strips B. It is to be understood, however, that other forms of address plates may be used. These plates stand in the magazine in a vertical stack, the lowermost plate resting on the ribs 29 of the arms 28 projecting forwardly from the bottom portion of the magazine bracket 20.

The plates are fed one after another from the bottom of the magazine forwardly to their active position by a pair of sprocket chains 50 which have a horizontal upper reach, stretching forwardly above the depressed portion 13 of the bed, the chains lying in two vertical planes as best illustrated in Figs. 1, 4, 5, and 15. The two chains at the forward end are shown as looped around a pair of sprockets 51, pinned on a driving shaft 52 rotatably mounted in the bed 10. At the rear, these chains pass around sprockets 54 on a short shaft 55 mounted in a yoke 56 which is adjustably secured to the rear end of frame 10. As shown in Fig. 15, a pair of guiding studs 57 carried by this yoke slides through openings in the frame and a bolt 58 anchored to the yoke passes loosely through the frame and has an adjusting nut 59 on its end portion. This enables the chains to be equalized and desired tension maintained upon them.

Certain links of the chains 50 have upstanding lugs 60 secured to the inner faces of the links and adapted to engage the end ribs $a^2$ of the address plates and feed these plates forwardly. In the machine proportioned as shown in the drawings, there are two of these lugs 60 on each chain. The lugs travel forwardly beneath the magazine and engage the bottom-most plate therein, and carry it forward to printing position, the plate sliding along the pawl ribs 15 rising from the depressed bed 13, Figs. 4 and 6. The machine is designed to feed the chains one-half their length at each cycle of operation, so that a pair of lugs engages the bottom-most plate, feeds it forward between the platens and discharges it, for each rotation of the driving shaft carrying the impression platen. This is quite an improvement over former machines having a step by step feed of the plates, which required several idle movements before the first plate was in position for printing.

Loosely journaled on the shaft 52 (Figs. 4, 5, 13, and 14) between the wheels 51 is the supporting platen 70 for the address plates. This platen has a segmental portion 71 designed to support the plate during printing operation, and a pair of arms 72 freely journalled on the shaft 52. The arcuate portion 71 has radial ribs 74 adapted to occupy the grooves $a'$ formed in the underside of the plate A. This platen has on its forward edge upstanding lips 75 and at its rear edge is provided with a bumper plate 76 adapted to engage a stationary shoulder 16 on the bed. A suitable tension spring 78 tends to swing the platen rearwardly to bring the bumper plate into engagement with this ledge 16. A suitable cushion strip 79 is shown as provided between the bumper plate 76 and the segment 71.

As the address plate A is fed forwardly by means of one of the pairs of lugs 60 on the chains, the forward edge of the plate comes into engagement with the lips 75. If the plate, due to momentum, stands any distance in front of the lugs 60, the engagement with the lips 75 stops the plate, so that its rear edge is caused to contact with the lugs 60. The plate is thus accurately positioned and the ribs 74 on the platen are in position to engage in the grooves $a'$ of the plate during the impressing operation, as about to be described.

Secured to one side of the frame of the machine and extending transversely over it at the printing position is the curved frame arm 18 which depends at the far side shown at 19. This depending portion of the arm and the intermediate portion provide bearings for the main shaft 80. Rotatably connected with this shaft 80 is the impression platen 81, which has a yielding arcuate pad 82 adapted to coact with the address plate. Secured on the shaft 80 is a suitable driving member, shown as a crank 87. Mounted on this shaft is also a gear 88 which meshes with a pinion 89 tight on the shaft 52. The gear 88 is angularly adjustable on the shaft 80, but is tightly held thereon during operation, as hereinafter described.

It results from the above described mechanism that when the crank 87 is rotated in the proper direction, the gearing and sprocket chains carry the bottom-most plate in the magazine forwardly into a position between the two platens, where the plate engages the lips 75 on the lower platen, and a continuation of that same rotation carries the plate (together with the interposed inking ribbon and paper) forwardly to effect the printing. In this operation, the plate shoves on the lips 75 and rocks the supporting platen forwardly and, before the plate clears the lips, the ribs 74 of the platen have begun to engage in the grooves of the plate, so that the plate and platen travel forwardly as a unit during the impressing operation, as illustrated clearly in Fig. 13.

When the plate finally clears the supporting platen, the spring 78 returns the platen to its normal rearmost position and the plate is discharged into the receiving drawer as hereinafter explained, the printed paper being fed out forwardly.

I have referred to the impression platen 81 as being rotatably secured to the main driving shaft 80. It is preferable, however, that an adjustment be provided, and accordingly I have shown this platen as mounted on an eccentric sleeve 90, which is mounted on the bushings 91 and 92 rigid on the shaft. The eccentric sleeve has on its outer end a plate 94 having an arcuate slot 95 through which passes a set screw 96 which is threaded in the arm-portion 19. The plate 94 furnishes ready means for turning the eccentric to adjust the presentation of the platen to the plate, and the set screw locks the sleeve in adjusted position. The platen is freely journaled on the eccentric sleeve, but receives its motion from the shaft 80 by means of Oldham coupling 100, comprising a ring having on one side a pair of diametric lugs 101 engaging a diametric groove in the collar 102 rigid on the shaft 80 and on the other side has lugs 103 90° distant from the lugs 101, these latter lugs engaging grooves in the end of the platen.

I find it convenient to make the platen of a built up construction, comprising a central casting or body 81 surmounted by a segmental portion 83 which carries the pad 82 and is held by a screw bolt 84. On the ends of the casting, I provide a pair of plates 85 and 86 secured to the casting by screws. The grooves for the lugs 103 are preferably made in the end plate 86.

To ink the address plate, I provide a reciprocating frame carrying a pair of ribbon spools. This frame is best shown in Figs. 1, 4, 5, 6, and 9 and comprises a pair of parallel bars 110 and 111, a cross bar 112 rigidly connected with these bars at their forward ends and a cross bar 113 connected to the bars at their rear ends. The rear cross member is provided with upstanding ears 115 which carry the rear ribbon spool 120. At the forward end, the cross bar 112 has downwardly extending ears 116 which carry the forward ribbon spool 121, the ribbon extending intermediately substantially in the same plane of the bars 110 but between them.

The bars 110 and 111 of the reciprocating frame are guided by flanged rollers 118 carried by the stationary frame in two rows at the opposite sides of the reciprocating frame as shown in Figs. 5 and 9. The grooves of these rollers receive reduced riblike portions 119 of the reciprocating bars.

The ribbon-carrying frame is reciprocated by the operation of the main shaft 80. In Figs. 5 and 8 I have shown on the inner face of the gear 88 a cam groove 130 in which lies a roller 131 on an arm 132 pivoted at 133 to the stationary arm 18. At its lower end this arm 132 engages a reciprocable rod 135 which is pivotally connected at its forward end 136 as shown in Figure 9, to a lever 137 intermediately pivoted to the frame at 138. The other arm of this lever is forked as at 139 and extends around a pin 117 carried by a bracket on the cross bar 112 of the reciprocating frame.

The cam groove 130 is so formed that about half of it is concentric of the axis as shown at 130ª; then there is a portion 130ᵇ of reduced eccentricity, which operates to pull the rod 135 rearwardly and thus move the ribbon frame forwardly. The movement caused by this portion of the cam gives the ribbon the same speed as the chains, so that the ribbon travels with the plate relatively stationary thereto between the platens during the printing operation. Following the printing impression, the groove 130 provides a slight dwell as indicated at 130ᶜ, and then there is a portion 130ᵈ of increasing radius which carries the ribbon frame rearwardly to return it to initial position during the time when the platens are out of coaction.

The ribbon spools 120 and 121 are mounted at one end on suitable driving members, and at the other end on stationary axial supports. I have placed the driving members and ratchet mechanism about to be described at the left hand side of the machine as one faces it at the delivery end. The forward driving member is journaled in one of the ears 116 and carries on its outer end the ratchet wheel 140. The rear driving member is journaled in one of the ears 115 and carries on its end a ratchet wheel 141. On their inner ends, these two driving members have eccentric lugs 145 adapted to occupy corresponding sockets in the adjacent flanges of spools and drive them. The other end of each spool is supported on a shiftable stud 145 mounted in respective ears on the reciprocating frame and pressed toward the spool by a spring 146.

Either spool may be readily removed from its mounting by first pressing it toward the shiftable stud until the spool clears the driving lug when it may be tipped sufficiently to be moved in the other direction across the ear carrying the driving member, and thus freed from the spring pressed stud.

The ribbon R passes from the front side of the rear spool 120 downwardly across a guiding rod 147 (Fig. 4) thence forwardly beneath the cross bar 113 and between the platens to the forward guiding rod 149; the ribbon then passes over this rod and thence downwardly onto the spool 121.

The two ratchet wheels 140 and 141 mentioned coact with suitable pawl mechanism to feed one or the other ribbon spool a slight portion of a rotation for each reciprocation of the ribbon frame. To effect this, I have shown a bar 150 pivoted to the left hand side of the frame and carrying near its opposite ends pawls 151 and 152 which coact with the respective ratchet wheels. Each pawl is in the form of a bell crank as illustrated in Figs. 10 and 11, and each has an arm to which is connected a tension spring 154, the other end of which is anchored to the end of an extension 155 or 156 of the bar.

The bar 150 is normally retained in either of two positions by a suitable detent device, as for instance, the spring pressed ball 157 (Fig. 12) which may engage either of a pair of depressions 158 in the bar. One of these holds the pawl 151 in position to engage the ratchet wheel 141; the other position holds the pawl 152 in position to engage the ratchet wheel 140.

In Fig. 1, I have shown the ribbon feeding mechanism in position to coact with the rear spool 120. As the return stroke of the reciprocating frame is coming to its completion, the ratchet wheel 141 engages the pawl 151 and the spool is given a slight rotation to wind up the ribbon, which runs upwardly to the forward side of the spool. When the ribbon becomes entirely wound on the spool 120 so that the other spool is empty, the ribbon provides undue resistance to the rotation of the ratchet wheel 141, and then, when the ratchet wheel engages the pawl, instead of the wheel rotating, the bar 150 is swung downwardly on its pivot by the pawl into the other position, throwing the pawl 152 into position to engage the ratchet 140. Now on the succeeding strokes the ratchet 140 engages its pawl and turns the spool 121 in the direction to wind the ribbon in towards the front, the ribbont passing downwardly onto the rear side of this spool.

By making the pawls 151 and 152 of the bell crank in the form shown, with the spring anchorage, I am able to effect the change described without danger of tearing the ribbon. Ordinarily the pawl operates as if it were rigid with the bar 150, being retained by spring 154 in the position shown in Fig. 10. During the period of automatic reversal of the direction of feed, the pawl swings into the position shown in Fig. 11, thus constraining the spring 154 and the reaction of this spring assist in snapping the bar over into its other position.

The mechanism described, it will be seen, not only provides for periodic feed of the ribbon in either direction, but results in automatic reversal of the direction whenever required.

In the operation of the machine, the operator ordinarily stands at the right hand end as shown in Fig. 1 and faces the machine, grasping the crank with his right hand and turning it in a right hand direction.

The paper or envelopes to be printed are at such time carried on a suitable support at the left hand side of the machine and manually fed one after the other, into printing position.

I have shown a table 160 at the left hand side of the machine and substantially aligning with the top of the machine, along which paper or envelopes may be conveniently fed into position. This table comprises a plate which may conveniently be anchored to the machine by key-hole slots 161, the small portions of which receive the shanks of pins or screws 162 on the frame. The table has a shiftable back guide 164 which may be adjustably positioned by means of slots 165 in the table and suitable clamping screws passing through them. Behind the platen is an adjustable back stop 167 carried by rods 168 extending through the ears 115 and clamped by the set screws 169.

On the opposite side to the table, I prefer to provide an abutment for stopping the paper, such abutment being shown as a sheet metal bracket 170 adjustably clamped to the frame, by set set screws 171 passing through slotted extensions 172, and having on its left hand side a downwardly extending portion 173 abutting the top of the frame. The portion 173 bears with a spring pressure against the smooth top plate 175 carried by the frame, so that there is no danger of the paper passing beneath it.

The paper is fed ordinarily by the left hand of the operator transversely of the machine along the guide 164 until the paper abuts the stopping bracket 170 and is positioned against the back stop 167. The paper is positioned by the operator during the turning of the crank to bring the plate forwardly, than, after the platen swings down into coaction with the plate, the paper as indicated at P in Fig. 13 travels forwardly with the plate and the ribbon and is impressed thereby and is delivered at the front of the machine.

The engagement of the impression platen with the plate moves the paper forwardly and tends to deliver it, but I do not rely on the momentum thus given to the paper to effect its complete delivery, but provide a special ejecting device for this purpose. This ejector consists of a pair of elastic strips or shoes 180 held in arcuate form at opposite ends of the platen and extending rearwardly from either side of the platen. These yielding shoes are preferably of rubber and are mounted on thin spring-metal backings 181 which extend from the platen in a direction which is slightly eccentric to the platen; that is to say, of increasing radius toward the free end. These arcuate strips lie directly above and coact with smooth rubbing plates 185 on the tops of the reciprocating frame bars 110 and 111.

During the impressing action of the platen, the paper is drawn forwardly between the coacting platens and also by these arcuate strips 180 and smooth plates 185, all of which have their contacting portions moving at the same speed. After the platen surface 82 clears the paper, the forward feed thereof is continued by the arcuate shoes 180, which press down on the paper and maintain the same grip on it to shove it forwardly. The friction between these rubber shoes and the paper is so much greater than between the paper and the smooth plates 185 that the forward movement of the paper continues uninterrupted notwithstanding the reverse movement of the reciprocating frame. Accordingly, the paper is automatically delivered beyond the forward end of the retreating ribbon for each cycle of operation.

The printed sheets or envelopes are delivered onto a receiving tray 190 shown in Fig. 1. This tray is suitably supported at the front of the machine, as for instance by ears 191 on the tray, the upper ends of which engage pins 192 carried by the machine. One of these cars 191 is omitted in Fig. 1 to show the pawl support behind it. This receiving tray also carries an adjustable upstanding abutment 193 to stop the paper.

At the same time that the paper is being delivered from the coacting platens to the receiving tray, the plate is delivered to a receiving drawer. A suitable drawer as shown at D (Fig. 4) is adapted to rest near its rear end on a cross rod 200 carried by the frame legs 11 and at its forward end on a cranked bail 201 mounted in the forward legs 12 of the frame. When this cranked bail is active, the drawer is supported in the inclined position shown in Figs. 1 and 4, but for removing the drawer the bail may be swung down so that the drawer may be shifted in a substantially horizontal direction.

In front of the supporting platen is an inclined support 210 down which the used plate may slide. In such movement the forward edge of the plate strikes against a cross plate 211 on a frame 212 pivoted at 213 and depending into the drawer. The plate then slides downwardly, the forward edge of the plate toward the bottom into the drawer, and the upper edge of the plate lying in front of a pair of spring toes 215 depending from the frame adjacent opposite ends of the plate. The swinging packer 212 is connected to an eccentric strap 216 which extends around an eccentric 218 tight on the shaft 52.

The result of the mechanism just described is that after the plate slides downwardly, first into engagement with the packer plate 211 and then into the drawer, it is forced toward the rear of the drawer against the previously delivered plates by a rearward movement of the packer, caused by the eccentric. In this rearward movement, the plate passes behind the spring toes 215 which prevent its return.

It will be seen that plates are delivered into the drawer with their forward edges at the bottom of the drawer and their printing surfaces toward the front. The plates are thus stacked in the drawer in the proper position to be again presented to the magazine. The loaded drawer may be taken out of the machine and suitably stored and whenever desired to reprint, it is only necessary to stand it upright in the opened magazine and discharge the plates thereinto, which will place them in upwardly facing position with their forward edges toward the front of the machine.

It is frequently desirable to print only a portion of the matter on an address plate, as for example where the address plate carries a salutation suitable for a letter but which must be omitted in addressing an envelope. I enable this omission of any portion of the plate in a very simple manner by providing a variable connection between the platen driving mechanism and the conveyor driving mechanism. In the preferred form, I effect this by mounting the gear 88 which drives the chains loosely on the shaft 80 and variably connecting it with the crank 87 which is tight on that shaft and thus turns the platen.

To the above end, I provide an arcuate series of holes 220 in a plate 224 adjustably mounted in the gear, any one of which holes may be occupied by a pin 221 carried by an extension 222 of the crank 87. This pin is pressed inwardly or toward the gear by a spring 223 and has a knurled head 225 by which it may be conveniently drawn outwardly to free the gear. Accordingly, to change the relation of the platen to the plate feed, it is only necessary to pull out the pin 221 and reset it in a different one of the holes 220 in the gear. Fig. 17 illustrates this readjustment of the impression platen to avoid the salutation $b$ on the plate.

The ribs 74 on the supporting platen are shown as coacting with grooves $a'$ in the address plate A, this plate being supported by the body of the platen between the ribs during the impressing operation. These ribs are available to support on their top surface a thinner plate at the same printing height as the plate shown. Thus the machine may print indiscriminately from grooved-bottom comparatively-thick plates, or from flat-bottom comparatively-thin plates without readjusting the machine. This feature however is claimed in my prior application No. 725,370, filed July 11, 1924.

It will be seen from the description given of the preferred embodiment of the invention shown in the drawings that the machine is comparatively simple for the results accomplished and is compact and adapted for easy and rapid operation. It is only necessary for the operator to install a stack of address plates from a drawer in the magazine and place the drawer in receiving position and then rotate the crank with his right hand and simultaneously feed the paper or envelopes into position with the left hand. All the other operations are automatic and result in an imprint being made from each address plate and the plate restacked in the drawer, which may then be returned to its cabinet.

I claim:—

1. In a machine of the character described, the combination with a printing form and platen, of a reciprocable frame, and an inking ribbon adapted to extend between the form and platen and having both ends carried by the frame.

2. In a machine of the character described, the combination with a series of address plates, of a rotary platen, a reciprocable frame, and an inking ribbon adapted to extend between an address plate and the platen and having both ends carried by the frame.

3. In a machine of the character described, the combination with a printing form and a rotative platen, of a reciprocable frame, and an inking ribbon adapted to extend between the form and the platen and having both ends carried by the frame, and means for periodically feeding said ribbon step by step.

4. The combination with a platen and a printing form, a reciprocating frame, a pair of spools carried thereby and adapted to carry the wound up ends of a ribbon extending intermediately between the form and platen.

5. The combination of a rotative platen, a reciprocating frame, a pair of spools carried thereby and a ribbon having its ends wound up on said spools.

6. The combination with a pair of platens, of address plates adapted to be fed serially between them, an inking ribbon adapted to extend between an address plate and one of the platens and a reciprocating frame carrying both ends of the ribbon.

7. The combination with a pair of coacting rotative platens, of address plates adapted to be fed serially between them, an inking ribbon adapted to extend between an address plate and one of the platens, a reciprocating frame and a pair of spools thereon located respectively on opposite sides of the pair of platens and carrying the ends of the ribbon.

8. The combination with means for supporting a stack of address plates, of means for feeding them, a pair of coacting platens between which the plates are fed successively, a reciprocating frame, spools thereon carried respectively on opposite sides of the pair of platens, and an inking ribbon extending from one spool to the other.

9. The combination with means for supporting a stack of address plates, of a pair of endless chains for feeding the bottommost plates successively, a pair of coacting rotative platens between which the plates are fed, a reciprocating frame, spools thereon carried respectively on opposite sides of the pair of platens, and an inking ribbon extending from one spool to the other.

10. The combination of a pair of platens, means for feeding address plates between them, a reciprocating frame having two bars extending respectively on the opposite sides of one of the platens, a pair of ribbon spools carried by said bars, a ribbon carried by said spools and extending intermediately between the platens, means for reciprocating the frame, and means for periodically and partially rotating one of said spools.

11. A machine of the character described, the combination of a pair of platens, means for feeding address plates between them, a ribbon extending between such plates and one of the platens, a pair of spools for carrying the ribbon, a reciprocable frame carrying the spools, means for rotating the platen which is adjacent the ribbon, a cam driven by said means, and a driving connection between said cam and said reciprocable frame.

12. In an addressing machine, the combination with means for supporting a stack of address plates, means for progressing them one after the other to a printing position, a reciprocable frame having movement independent of said progressing means, a pair of ribbon spools carried by the frame, and an inking ribbon on said spools.

13. In an addressing machine, the combination with means for supporting a stack of address plates, of a pair of traveling chains for feeding said plates, a reciprocable frame, a pair of ribbon spools carried thereby, and an inking ribbon wound on said spools.

14. In an addressing machine, the combination with means for supporting a stack of address plates, a pair of traveling chains for feeding said plates, a reciprocable frame, a pair of ribbon spools carried thereby, an inking ribbon wound on said spools, and means for feeding the chains and frame at the same speed during printing and thereafter returning the frame while the chains continue their movement.

15. The combination with a platen and means for supporting and feeding address plates, of a ribbon extending between such address plates and said platen, a pair of spools carrying the wound up ends of the ribbon, a reciprocating frame carrying the spools, a pivoted bar and pawls carried thereby adapted to engage ratchet wheels on the respective spools.

16. The combination with a stationary frame of a pair of platens, address plates adapted to be fed between them, a reciprocable frame, a pair of ribbon spools carried thereby, a racket wheel on each spool, a bar pivoted on the stationary frame, and a pair of pawls carried by the bar and adapted to alternately coact with the respective ratchets according to the position of the bar.

17. The combination with printing means, of a pair of spools adapted to carry the wound up ends of an inking ribbon, ratchet wheels connected to the spools respectively, a reciprocating frame carrying the spools, and ratchet wheels, a pivoted bar having two positions, pawls carried thereby adapted to engage the ratchet wheels on the respective spools, and means whereby the bar is automatically shifted from one position to the other when a spool becomes empty.

18. The combination of a reciprocable frame, a pair of spools carried thereby, a ratchet wheel on each spool, a pivoted bar, a pair of bell-crank pawls carried by the bar and adapted to alternately coact with the respective ratchets according to the position of the bar, and springs connected to the bell-crank arms of the pawls.

19. In a machine of the character described, the combination with means for feeding address plates, of a pair of coacting platens having smooth surfaces, one of said platens being oscillatory and the other rotary, and means for feeding address plates between them.

20. In a machine of the character described, the combination with means for feeding address plates, of a pair of platens between which they are fed, one of the platens being oscillatory and the other rotary, the oscillatory platen having means tending to return it and being provided with means whereby such yielding return positions the address plate.

21. In a machine of the character described, the combination of a pair of chains having lugs for feeding address plates, of a pair of platens between which they are fed, one of the platens being oscillatory and having a spring tending to return it and being provided with means whereby such yielding return forces the address plate against said lugs.

22. The combination with chains having lugs for feeding address plates, of an oscillatory platen for supporting said plates, said platen having a lip adapted to engage the forward edge of the plate, and a spring tending to return the platen, whereby the plate is maintained in contact with the lugs during the printing.

23. The combination with a magazine for address plates of chains having lugs for feeding the address plates, a rotary platen for impressing the plates, an oscillatory platen for supporting said plates, said oscillatory platen having a lip adapted to engage the forward edge of the plate, and a spring tending to move said lip rearwardly to maintain the plate in contact with the lugs during the printing.

24. The combination with means for feeding address plates, of an oscillatory platen adapted to support such plates, said platen having longitudinal ribs on the surface adapted to enter grooves in a grooved plate or engage the flat bottom of ungrooved plate, and means coacting with such plate on platen to effect the printing.

25. In an addressing machine, the combination of a magazine having an open front, a pair of shields overhanging said front from opposite sides, a pair of pivoted frames carrying said shields, mechanism connecting said frames whereby movement of one is accompanied by movement of the other, and a single operating handle for causing such movement.

26. In an addressing machine, the combination of a pivoted magazine having an open front, a pair of shields overhanging said front from opposite sides, a pair of pivoted frames carrying said shields, articulated arms connecting said frames whereby movement of one causes movement of the other, and an operating handle on one of said arms adapted to swing both shields and also tip the magazine.

27. In an addressing machine, the combination with means for feeding address plates, a platen coacting therewith, driving means for the platen and plate feeder, and means for changing the relation of the platen to the plates.

28. The combination of means for feeding address plates, a rotary platen to coact therewith, a common driver for the platen and plate feeder, and means for changing the relation of the platen to the plate feeder, whereby different portions of the platen may be caused to coact with the platen.

29. The combination with means for supporting a stack of address plates, a pair of feeding chains having lugs, a rotary platen, a common driver for the platen and chains, and means for changing the relation between the platen and chains.

30. In an addressing machine, the combination with means for supporting address plates, traveling chains adapted to feed the plates one after the other, a rotary platen adapted to coact with the plates, a shaft for driving said platen, a gear loose on said shaft for driving said chains, and a driving member tight on said shaft and adapted to be variably connected with said gear.

31. In an addressing machine, the combination with means for supporting address plates, means adapted to feed the plates one after the other, a supporting platen for the plates, a coacting rotary platen, a shaft carrying said rotary platen, a gear loose on said shaft for driving said feeding means, and a crank rigid on the shaft and variably connected to said gear.

32. In an addressing machine, the combination with means for feeding address plates, a segmental platen adapted to coact therewith, and a paper ejector carried by the platen and projecting behind it.

33. The combination with means for supporting a stack of address plates, means for feeding them one after the other, a rotary segmental platen adapted to coact with the plates, and a pair of paper ejectors carried by the platen at its opposite ends and trailing behind it.

34. The combination with a stack of address plates and means for feeding them one after the other, of a platen mounted to turn about an axis and coact with the plates and a pair of elastic arcuate arms at opposite ends of the platen adapted to engage the paper, and feed it after the platen has cleared the paper.

35. In an addressing machine, the combination with means for feeding address plates, a pair of platens adapted to coact with such plates, means for moving the platens, and a paper ejector carried by said means and adapted to act to advance the paper after the platen has freed it.

36. The combination with a stack of address plates and means for feeding them one after the other, of an impression platen mounted to turn about an axis and coact with the plates, means supporting the plates during such coaction, and a pair of elastic arcuate shoes at opposite ends of the impression platen adapted to engage the paper, and smooth members supporting the paper beneath said shoes whereby it is ejected after the impression platen has cleared it.

37. In an addressing machine, the combination with means for feeding address plates, a platen to which they are fed, means for supporting a drawer into which the plates are discharged after coacting with the platen, and a pair of spring detent devices engaging opposite ends of the plates as they are restacked and preventing their return.

38. In an addressing machine, the combination of means for supporting a stack of plates, a pair of chains for feeding said plates from the bottom of the stack, a supporting platen mounted between the chains, a coacting pressure platen, a drawer into which the plates are adapted to be discharged after passing between the platens, an arm depending toward the drawer for feeding plates, a strap connected to said arm, and a shaft carrying the supporting platen and having an eccentric embraced by said strap.

39. In an addressing machine, the combination with means for carrying a stack of address plates, a conveyor for progressing the same, a platen adapted to coact with the plates so fed, a drawer adapted to receive plates discharged by the conveyor after being printed, and a cranked bail beneath the drawer adapted to raise it into active position or lower it into removing position.

40. In an addressing machine, the combination with means for feeding address plates, of a ribbon adapted to extend across the said plates, the length of the ribbon lying transversely of the printing lines on the plate, a platen adapted to coact with such ribbon and plate, a paper table on one side of the machine, whereby a sheet of paper may be fed from the paper table sideways onto the machine, and means at the front of the machine to receive such paper ejected forwardly.

41. In an addressing machine, the combination with means for supporting a stack of plates, means for feeding them and a platen to coact with them, of means whereby paper may be placed between a plate and the platen by movement in one direction, and means for delivering such paper by movement at right angles to its feeding movement.

42. In an addressing machine, the combination of means for supporting a stack of address plates, chains for feeding the plates one after the other forwardly from the stack, a platen between the chains adapted to support said plates, a rotary impression platen above such supporting platen, a rigid frame arm mounted at one side of the ribbon only and carrying said impression platen, a paper table at the opposite side of the machine and means for ejecting the printed paper toward the front of the machine.

In testimony whereof, I hereunto affix my signature.

CLIFTON CHISHOLM.